United States Patent
Kalyanasundaram et al.

(10) Patent No.: US 9,223,167 B2
(45) Date of Patent: Dec. 29, 2015

(54) LIQUID CRYSTAL SWITCHING BARRIER THERMAL CONTROL

(71) Applicant: Apple Inc., Cupertino, CA (US)

(72) Inventors: Nagarajan Kalyanasundaram, San Jose, CA (US); Amaury Heresztyn, Woodside, CA (US)

(73) Assignee: APPLE INC., Cupertino, CA (US)

( * ) Notice: Subject to any disclaimer, the term of this patent is extended or adjusted under 35 U.S.C. 154(b) by 368 days.

(21) Appl. No.: 13/927,745

(22) Filed: Jun. 26, 2013

(65) Prior Publication Data

US 2015/0002769 A1    Jan. 1, 2015

(51) Int. Cl.
| | | |
|---|---|---|
| *G02F 1/1335* | (2006.01) | |
| *G02F 1/1334* | (2006.01) | |
| *G02F 1/1347* | (2006.01) | |
| *H04M 1/02* | (2006.01) | |

(52) U.S. Cl.
CPC .......... *G02F 1/1334* (2013.01); *G02F 1/13476* (2013.01); *H04M 1/0266* (2013.01)

(58) Field of Classification Search
CPC .................................................. G02F 1/1334
See application file for complete search history.

(56) References Cited

U.S. PATENT DOCUMENTS

| | | |
|---|---|---|
| 4,104,523 A | 8/1978 | Wolfert |
| 4,614,528 A | 9/1986 | Lennen |
| 4,620,248 A | 10/1986 | Gitzendanner |
| 4,863,499 A | 9/1989 | Osendorf |
| 4,967,201 A | 10/1990 | Rich, III |
| 4,975,761 A | 12/1990 | Chu et al. |
| 4,982,783 A | 1/1991 | Fickett et al. |
| 5,025,336 A | 6/1991 | Morehouse et al. |
| 5,050,038 A | 9/1991 | Malaurie et al. |
| 5,148,337 A | 9/1992 | Cullen et al. |
| 5,225,104 A * | 7/1993 | Van Steenkiste et al. ............ 252/299.01 |
| 5,392,177 A | 2/1995 | Chainer et al. |
| 5,440,172 A | 8/1995 | Sutrina |
| 5,500,785 A | 3/1996 | Funada |
| 5,586,007 A | 12/1996 | Funada |
| 5,781,768 A | 7/1998 | Jones, Jr. |
| 5,792,677 A | 8/1998 | Reddy et al. |
| 5,843,333 A * | 12/1998 | Hakemi ................. 252/299.5 |
| 5,898,573 A | 4/1999 | Fugaro |
| 5,905,636 A | 5/1999 | Baska et al. |
| 5,953,001 A | 9/1999 | Challener et al. |

(Continued)

FOREIGN PATENT DOCUMENTS

| | | |
|---|---|---|
| JP | 2000252667 | 9/2000 |
| JP | 200422928 | 1/2004 |

OTHER PUBLICATIONS

Jeon et al., Thermal Conductivity Measurement of Anisotropic Material Using Photothermal Deflection Method, Thermochimica Acta, vol. 477, Issue 1, pp. 32-37, 2008.

*Primary Examiner* — Timothy L Rude

(74) *Attorney, Agent, or Firm* — Brownstein Hyatt Farber Schreck, LLP

(57) ABSTRACT

A polymer dispersed liquid crystal layer applied to the display screen for an electronic device is described herein. The polymer dispersed liquid crystal applied to the display screen is operable to switch between a transparent state and a translucent and/or opaque state. In the transparent state the display screen is viewable as usual. In the translucent and/or opaque state the liquid crystal prevents incident solar radiation from heating up the internal components of the device.

17 Claims, 8 Drawing Sheets

(56) References Cited

U.S. PATENT DOCUMENTS

| | | | |
|---|---|---|---|
| 6,076,171 A | 6/2000 | Kawata |
| 6,143,058 A | 11/2000 | Dahlgren et al. |
| 6,160,705 A | 12/2000 | Stearns et al. |
| 6,175,088 B1 | 1/2001 | Saccocio |
| 6,212,071 B1 | 4/2001 | Roessler et al. |
| 6,239,972 B1 | 5/2001 | Tehan et al. |
| 6,243,269 B1 | 6/2001 | Dibene, II et al. |
| 6,243,656 B1 | 6/2001 | Arai et al. |
| 6,286,212 B1 | 9/2001 | Eaton |
| 6,347,037 B2 | 2/2002 | Iijima et al. |
| 6,407,595 B1 | 6/2002 | Huang et al. |
| 6,462,410 B1 | 10/2002 | Novotny et al. |
| 6,504,243 B1 | 1/2003 | Andric et al. |
| 6,507,102 B2 | 1/2003 | Juskey et al. |
| 6,556,455 B2 | 4/2003 | Dibene et al. |
| 6,624,816 B1 | 9/2003 | Jones, Jr. |
| 6,646,635 B2 | 11/2003 | Pogatetz et al. |
| 6,687,320 B1 | 2/2004 | Chiu et al. |
| 6,747,300 B2 | 6/2004 | Nadd et al. |
| 6,778,387 B2 | 8/2004 | Fairchild |
| 6,803,328 B2 | 10/2004 | McCullough |
| 6,832,410 B2 | 12/2004 | Hedge |
| 6,847,529 B2 | 1/2005 | Dibene et al. |
| 6,886,625 B1 | 5/2005 | Sagal et al. |
| 6,891,724 B2 | 5/2005 | De Lorenzo et al. |
| 6,896,045 B2 | 5/2005 | Panek |
| 6,900,992 B2 | 5/2005 | Kelly et al. |
| 6,930,885 B2 | 8/2005 | Barcley |
| 6,956,549 B2 | 10/2005 | Naiki |
| 6,987,671 B2 | 1/2006 | Houle |
| 7,006,353 B2 | 2/2006 | Matteson |
| 7,045,719 B1 | 5/2006 | Alexander et al. |
| 7,045,885 B1 | 5/2006 | Chen et al. |
| 7,085,135 B2 | 8/2006 | Chu et al. |
| 7,125,433 B2 | 10/2006 | Garikipati et al. |
| 7,148,125 B2 | 12/2006 | Suzuki et al. |
| 7,149,909 B2 | 12/2006 | Cui et al. |
| 7,190,585 B2 | 3/2007 | Houle |
| 7,215,551 B2 | 5/2007 | Wang et al. |
| 7,269,015 B2 | 9/2007 | Hornung et al. |
| 7,270,176 B2 | 9/2007 | Bell et al. |
| 7,295,441 B1 | 11/2007 | Laio et al. |
| 7,301,755 B2 | 11/2007 | Rodriguez et al. |
| 7,303,005 B2 | 12/2007 | Reis et al. |
| 7,393,226 B2 | 7/2008 | Clayton et al. |
| 7,401,243 B2 | 7/2008 | Knepper et al. |
| 7,433,191 B2 | 10/2008 | Blanco, Jr. |
| 7,440,281 B2 | 10/2008 | Bailey et al. |
| 7,451,332 B2 | 11/2008 | Culbert et al. |
| 7,454,316 B2 | 11/2008 | Bose et al. |
| 7,532,480 B1 | 5/2009 | Mimberg |
| 7,671,282 B2 | 3/2010 | Lee |
| 7,709,951 B2 | 5/2010 | Brodsky et al. |
| 7,730,336 B2 | 6/2010 | Marinkovic et al. |
| 7,782,613 B2 | 8/2010 | Harris |
| 7,787,249 B2 | 8/2010 | Sundstrom |
| 7,787,252 B2 | 8/2010 | Mertol |
| RE41,637 E | 9/2010 | O'Hara et al. |
| 7,791,597 B2 | 9/2010 | Silverstein et al. |
| 7,800,916 B2 | 9/2010 | Blackwell et al. |
| 7,805,689 B2 | 9/2010 | Ueda et al. |
| 7,840,827 B2 | 11/2010 | Dahan et al. |
| 7,866,941 B2 | 1/2011 | Li et al. |
| 7,880,586 B2 | 2/2011 | Fagrenius et al. |
| 7,882,369 B1 | 2/2011 | Kelleher et al. |
| 7,973,473 B2 | 7/2011 | DeCook et al. |
| 8,115,112 B2 | 2/2012 | Corisis et al. |
| 8,165,646 B2 | 4/2012 | Zheng |
| 8,215,012 B2 | 7/2012 | Blanco, Jr. |
| 8,253,026 B2 | 8/2012 | Strauss et al. |
| 8,260,097 B2 | 9/2012 | Meadowcroft et al. |
| 8,345,414 B2 | 1/2013 | Mooring et al. |
| 8,383,962 B2 | 2/2013 | Sutardja |
| 8,477,490 B2 | 7/2013 | Rothkopf et al. |
| 8,482,929 B2 | 7/2013 | Slaton et al. |
| 8,735,728 B2 | 5/2014 | Cheng |
| 2005/0077614 A1 | 4/2005 | Chengalva et al. |
| 2006/0120051 A1 | 6/2006 | Macris et al. |
| 2006/0134831 A1 | 6/2006 | Cohen et al. |
| 2008/0049394 A1 | 2/2008 | Nishi |
| 2009/0146975 A1 | 6/2009 | Chang |
| 2009/0284534 A1 | 11/2009 | Hendry et al. |
| 2010/0103147 A1 | 4/2010 | Sumpter |
| 2010/0288947 A1* | 11/2010 | McCarthy et al. ......... 250/517.1 |
| 2011/0085304 A1 | 4/2011 | Bindrup et al. |
| 2011/0096253 A1* | 4/2011 | Zhang et al. .................... 349/16 |
| 2011/0194252 A1 | 8/2011 | Wang |
| 2011/0232881 A1 | 9/2011 | Downing et al. |
| 2012/0026419 A1* | 2/2012 | Takenaka et al. ............... 349/33 |
| 2012/0318484 A1 | 12/2012 | Hirasawa |
| 2014/0161684 A1 | 6/2014 | Ooga |
| 2014/0371931 A1* | 12/2014 | Lin et al. ....................... 700/287 |

\* cited by examiner

LIQUID CRYSTAL SWITCHING BARRIER THERMAL CONTROL

TECHNICAL FIELD

Embodiments generally relate to utilizing a film to block at least a portion of ambient radiation from entering the interior of an electronic device, and more particularly to using a switchable film blocking thermal radiation and/or light from entering the interior of an electronic device through a display.

BACKGROUND

Solar radiation directly incident on any object increases the steady state temperature of the object. When solar radiation is incident on a device such as a phone, music player, a laptop, a tablet computer or the like, there is potential for the internal electronics and enclosure of the device to increase in temperature. Taking a device out in the sun will make a device hot. Heat caused by solar radiation is in addition to the internal heat created by use of the device. An increase in enclosure temperature for these types of devices may potentially result in damage to the device, user discomfort and/or in the worst cases injury to the user. To prevent or limit the negative effects of solar radiation on a device, the device may be throttled and/or shutdown in response to increasing temperatures and/or once the temperature exceeds allowable limits. Generally, to maintain user satisfaction with the device, the time to shutdown/throttling may to be as high as possible. As such, reducing the amount of solar radiation transmitted through a display may provide an improved user experience and improve the utility of the device.

Reducing the radiation transmitted through a display is very challenging. Limiting the radiation transmitted into the display may have the negative effect of limiting transmission of images created by the device to the user. For example, one solution to the problem has been to utilize numerous layers (e.g. in some applications 25 plus layers) of filters, each one configured to block specific wavelengths of problematic radiation. However, not only is this approach cost intensive but it also degrades the viewable image on the device.

SUMMARY

Systems for improving the thermal performance of a device are described herein. Various embodiments described herein encompass the use of one or more thermal shielding layers in an electronic device. For example, polymer dispersed liquid crystal (PDLC) layers may be applied to or incorporated into the display surface of a device. The device may have a cover window protecting the internal hardware of the device. The polymer dispersed liquid crystal (PDLC) layer may be positioned adjacent to the cover window. The PDLC layer may be operable in a first state and a second state. The first state may be transparent. The second state may be translucent and/or opaque. The PDLC layer may be in communication with the device hardware which provides at least one of a switching signal or power supply to the PDLC layer.

One embodiment takes the form of a device comprising: a cover window protecting an internal hardware element; a display stack underlying the cover window; and a polymer dispersed liquid crystal (PDLC) layer positioned adjacent to the cover window; wherein the PDLC layer is operable in a first state and a second state; the PDLC layer is in communication with the internal hardware; and the internal hardware element provides at least one of a switching signal or power supply for applying an electric field to the PDLC layer.

Another embodiment takes the form of a method of improving thermal performance of an electronic device comprising: receiving a first signal generated by a component internal to the electronic device and external to a display; changing a voltage supplied to a thermal shielding layer in response to the receiving the first input, the voltage changing from a first level to a second level; and through changing the voltage to the second level, darkening the thermal shielding layer.

Still another embodiment takes the form of a liquid crystal switching barrier accessory comprising: a polymer dispersed liquid crystal (PDLC) layer operable in a first state and a second state, wherein the PDLC layer is movable and configured to be placed adjacent to an exterior cover window of a display of an electronic device; a hardware component configured to switch the crystals in the PDLC layer from a first state to a second state; and an input, configured to connect to the electronic device and receive at least one of a switching signal or power supply.

BRIEF DESCRIPTION OF THE DRAWINGS

FIG. 1B illustrates a transparent cover portion of the user device of FIG. 1a.

DETAILED DESCRIPTION

Numerous consumer and non-consumer devices utilize electronic displays, such as liquid crystal displays, light-emitting diode (LED) displays, organic light-emitting diode (OLED) displays, and the like, to convey information to a user and/or viewer. To properly view the information on the display, the cover glass or other external barrier overlying the display may transmit a wide range of wavelengths of electromagnetic radiation (in some cases, the transmissible wavelengths may range from ultraviolet light, through the visible spectrum and into the infrared spectrum).

Because the display is at least partially transparent to radiation, transmission may occur in both directions. For example, solar radiation may enter the device through the display area, thereby heating internal components. Such heating may damage an internal component or components, or may adversely affect the lifespan and/or operation of a component or components.

To reduce the amount of solar radiation entering a device, a thermal shielding layer may be employed to reduce heat transfer to a device or to an interior of a device. In one embodiment, the thermal shielding layer may be a switchable liquid crystal barrier placed in the path of thermal radiation, such as sunlight. In various embodiments, the switchable liquid crystal barrier may be placed adjacent to the protective cover glass of the device, or within a display stack. The liquid crystal barrier may be switched between a transparent state and a translucent state, or even an opaque For example, when a user wants to view information on the display, the liquid crystal barrier may be placed in a transparent state. When a user does not want to view the display, then the liquid crystal barrier may be placed in a translucent or opaque state. The states may also be switched automatically without the user's control.

It may be noted that, because overheating is occasionally an issue with electronic devices, devices may be able to shut down or throttle down their performance when temperature increases past a certain threshold. Because solar radiation may add to the internal heat of an electronic device, a switchable liquid crystal barrier that can limit the amount of solar radiation coming into a device, may beneficially affect the length of time to shutdown/throttling on a device (e.g. the time to shutdown/throttling may be extended.) By blocking a portion of the solar radiation coming into the electronic device a switchable liquid crystal barrier may prolong the length of time that a user can operate an electronic device without shutdown/throttling occurring.

Figure 1A:
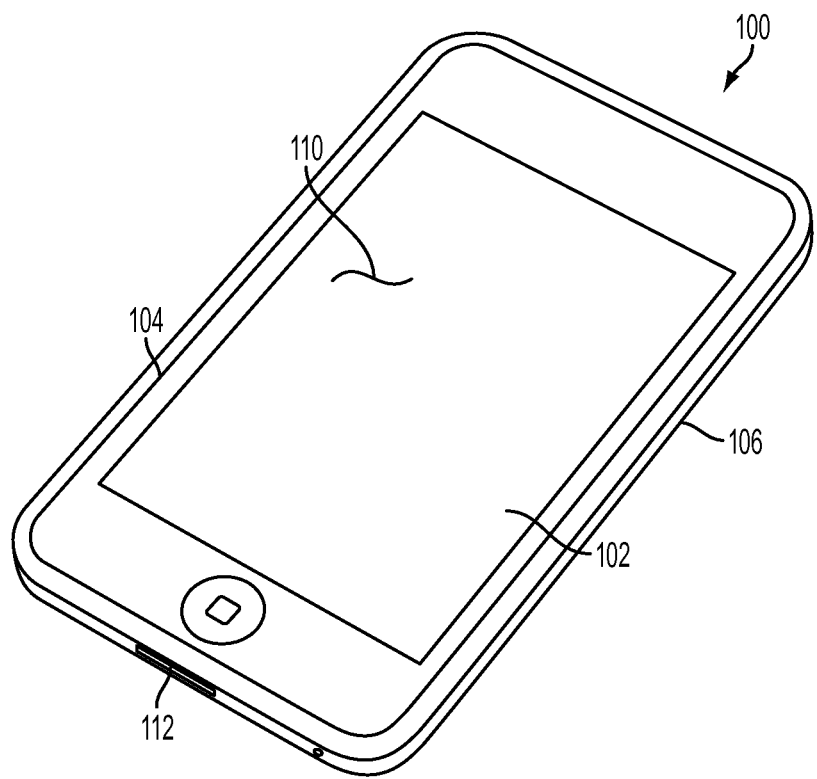
FIG. 1A illustrates a user device having a display.

In accordance with various embodiments, FIG. 1a illustrates a device which may utilize an electronic display. Device 100 may additionally utilize a protective covering over the display such as, a cover glass or the like. In various examples, device 100 may take the form of a mobile phone, tablet computer, notebook computer, instrument cluster, appliance screen and the like.

Device 100 may include a cover 102 with a bezel 104 about all or a part of its outer periphery (e.g. edge) where bezel 104 is able to be coupled to housing 106 in a manner that secures cover 102 to device 100. This cover may be formed from a glass, in which case it is typically referred to as a "cover glass." A cover glass may be strengthened to resist damage in certain embodiments. Likewise, the cover may be formed from a variety of transparent or near-transparent materials in addition to glass, including sapphire, plastic, and the like.

Figure 1B:
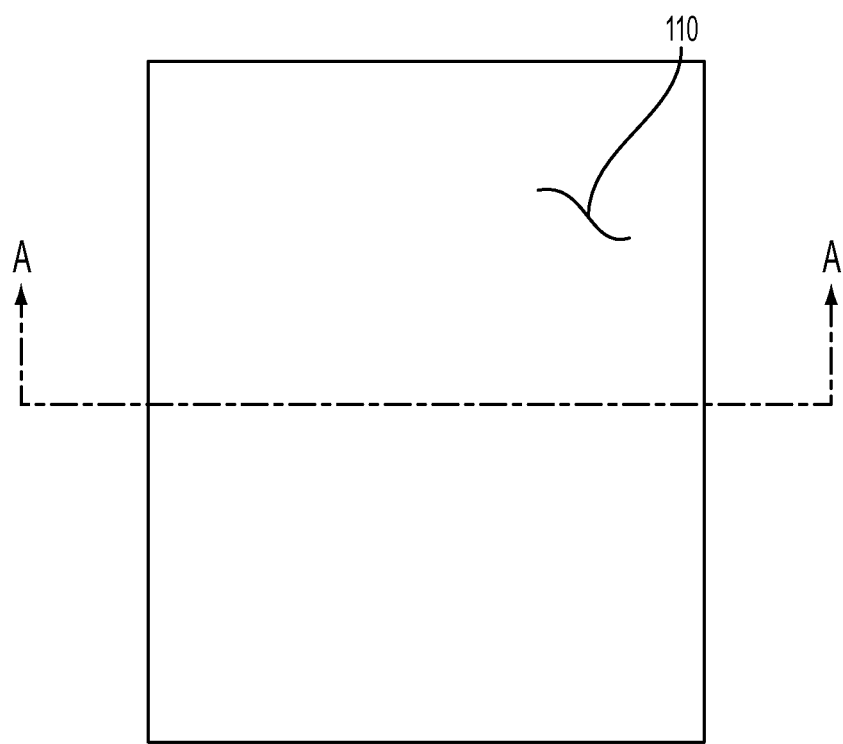

Depending on the application, bezel 104 and housing 106 may be formed of a variety of different materials including, but not limited to, polymer materials (e.g. plastics), metals (e.g. aluminum, steel, etc.), amorphous glass materials, composite materials, and combinations thereof. Cover 102 may include an external communication port 112. External communication port 112 may include any device port that can send or receive signals and/or a power supply. Cover 102 may include a variety of components for viewing the display of the device 100. Cover 102 may also include a variety of components functioning as an external interface. As many electronic devices include touch screens, cover 102 may include a touch screen as an external interface for users (although other physical switches and/or buttons may function as external interfaces). Particularly, cover 102 may have a transparent portion or window 110 formed therein. Window 110, as illustrated in FIG. 1B, may be formed from any substrate provided to protect the internal components of device 100. As with the overall cover and in accordance with various embodiments, window 110 may be manufactured from any of a variety of different materials. The materials may include transparent polymer, glass (whether or not strengthened), sapphire, plastics, and/or transparent crystalline materials.

Figure 2:
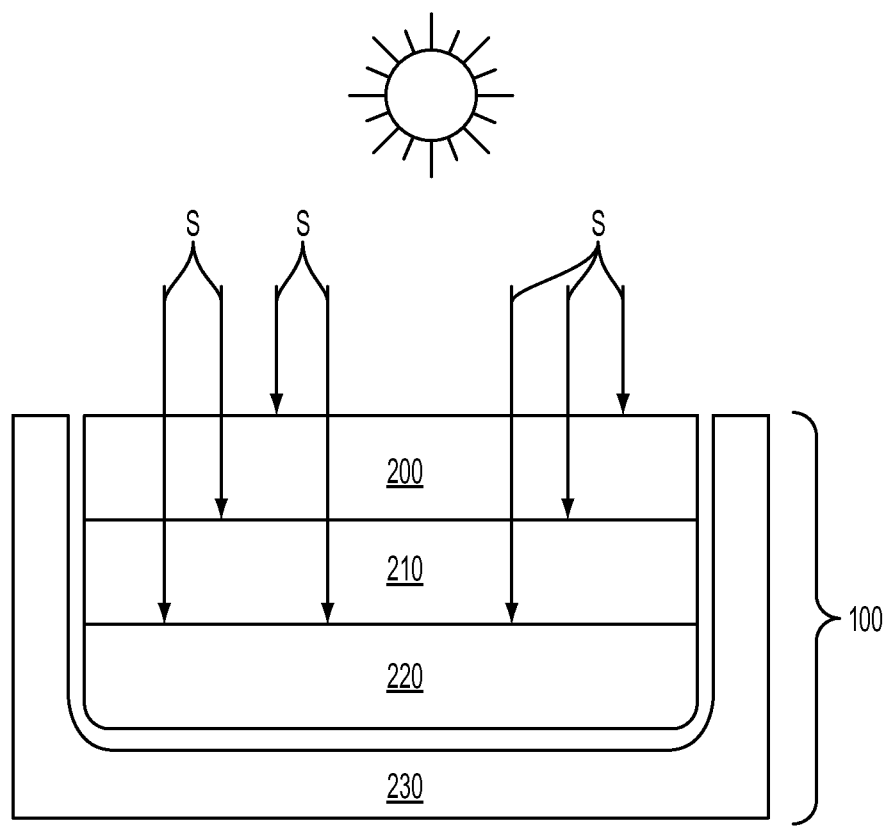
FIG. 2 illustrates a cross-sectional schematic view of solar radiation with respect to various components of a user device.

FIG. 2 generally shows a cross-section of the device 100 of FIG. 1. The device 100 may include window 200 (which generally corresponds to the window 110 shown in FIG. 1), display stack 210, internal electronic hardware 220, and cover 230. Window 200 as illustrated in FIG. 2 is a schematic representation of a device window like window 110 from FIGS. 1A and 1B. In accordance with various embodiments, a display stack 210 may be positioned below window 200. The display stack 210 may include any of a variety of components used in the visual display of device 100. For example, display stack 210 may include polarizing filters, color filters, liquid crystal layers, pixel layers and other active circuitry, and the like.

Internal electronic hardware 220 may be any of the components of device 100 operable to drive the functionalities and accessories of device 100, such as a processor, programmable memory, one or more sensors, circuit boards, internal connectors, data storage devices, and the like including all hardware usable to store, drive, control and operate programs, accessories and any other functionality of device 100. Cover 230 may overlay the display stack 210, internal electronic hardware 220 and the like. For example, cover 230 may cooperate with housing 106 and/or bezel 104, as illustrated in FIG. 1A, to form an enclosure for the device 100. Referring to FIG. 2, it may be noted that solar radiation "S" (which may include any electromagnetic radiation in the ultraviolet, visible light and inferred spectrums) passes through window 200 and display stack 210. Some solar radiation "S" may also be absorbed by the various components of device 100 such as by one or more of window 200, display stack 210, internal electronic hardware 220, and cover 230. It is this absorption of the energy of solar radiation "S" by these various components that may increase the temperature within device 100.

Window 110 may be combined with one or more other layers of differing materials and orientations. In accordance with various embodiments, window 110 may be layered with, or adjacent to, a liquid crystal layer. Any known or developed liquid crystal layers maybe used to function as a solar radiation barrier. In accordance with various embodiments, a polymer dispersed liquid crystal (PDLC) may be utilized. PDLC have liquid crystals that are dispersed in a polymer matrix. In some embodiments, the PDLC may be contained between two substrates such as glass, crystalline or plastic substrates. The stack of substrates and liquid crystal may together form the PDLC layer, although in other embodiments the PDLC alone may form the PDLC layer. As one example, the cover glass (or a portion thereof, such as the window) may form one substrate to contain or constrain the PDLC.

The optical axes of the liquid crystals within a PDLC layer may be re-oriented in response to an electric field being applied across the PDLC layer. Re-orientation of the optical axis may cause the liquid crystals to align or un-align. For example, in response to crystals aligning the PDLC layer may become translucent or opaque. The translucent or opaque PDLC layer may block or limit solar radiation from passing through the layer. In another embodiment, re-orientation of the optical axis may cause the liquid crystals to align resulting in a transparent PDLC layer. The transparent PDLC layer may allow the display to be viewed by the user.

As discussed throughout, the PDLC layer may have a plurality of states. For example, a first state may be a transparent state. A second state may be a translucent state. A third state may be an opaque state. The optical axes of the crystals can be oriented in particular direction by applying or removing an electric field. On-state PDLCs allow the crystals to be aligned when an electric field is applied. In the on-state PDLCs, the film/glass is transparent when an electric field is applied. Off-state liquid crystals allow the crystals to be aligned when no electric field is applied. In the off-state PDLCs, the PDLC layer is transparent when no electric field is applied. A transparent PDLC layer may allow most of the radiation to pass through it, whereas, an opaque PDLC layer may scatter most of the radiation incident on it. A translucent state of a PDLC layer may be any state that transmits light less than a transparent state but more than an opaque state.

Power may be supplied from an internal source of the device 100 to the PDLC layer in any suitable fashion, configuration or manner. For example, a trace or circuit may connect the PDLC layer to an internal battery of the device. In some embodiments, the trace/circuit may be routed to the PDLC layer in such a fashion as to not interfere with the user's view of, and interaction with, the display. As another example, a trace/circuit may be at least partially or fully routed in a portion of the device 100 that is masked by ink or an opaque structure and the PDLC layer may abut or extend slightly beneath such a masking area.

In certain embodiments, the PDLC layer may default to or ordinarily occupy an off-state when not powered. The off-state is generally transparent when not powered, thereby permitting radiation (typically including light and heat) to pass through the layer.

The PDLC may be configured such that an electric field may be applied to the PDLC layer to make the layer translucent or opaque, thereby reducing the radiation passing through the layer and display stack. In various embodiments, the electric field may be applied before the device's temperatures reaches defined temperature limits on any component or on the enclosure (e.g. a thermal shutdown temperature). The thermal shutdown temperature may be measured, for example, by a thermal sensor within the electronic device. Alternatively, the thermal shutdown temperature may not be an ambient temperature within the device, but instead may be the temperature of one or more specific components within the device.

In some embodiments, the PDLC layer may default to or ordinarily be in an on-state. The on-state is configured such that an electric field may be applied to the PDLC layer to make the display transparent. In various embodiments, the electric field may be shut off before the device's temperatures reaches defined temperature limits on any component or on the enclosure (e.g. a thermal shutdown temperature). In this embodiment, once the electric field is shut off the display becomes translucent or opaque limiting the negative effects of solar radiation. In various embodiments, a PDLC layer may be applied to one side or the other of Window 110.

Figure 3A:
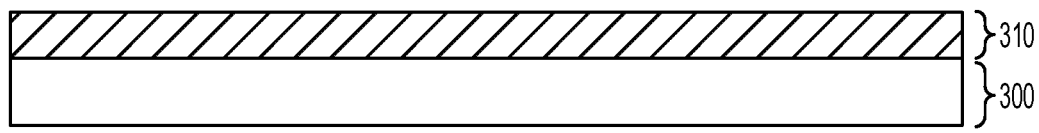
FIG. 3A illustrates a cross-sectional schematic view of a first embodiment of transparent cover portion of the user device of FIG. 1 incorporating a thermal shielding barrier taken, the cross-section taken along section line A-A of FIG. 1b.
Figure 3B:
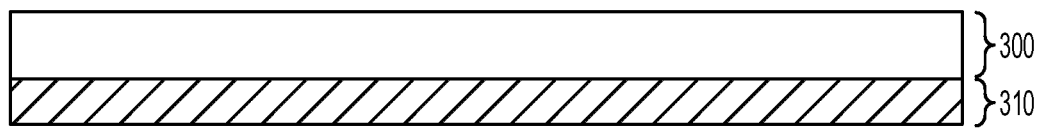
FIG. 3B illustrates a cross-sectional schematic view of a second embodiment of transparent cover portion of the user device of FIG. 1 incorporating a thermal shielding barrier taken, the cross-section taken along section line A-A of FIG. 1b.

As indicated above and with respect to FIGS. 3A and 3B, a PDLC layer 310 may be applied to window 300. Window 300, as depicted in FIGS. 3A and 3B, generally is shown with respect to cross-section line A-A of FIG. 1B and may be a portion of a cover glass, cover or other surface. Any number of PDLC layers 310 may be applied to substrate 300.

In accordance with various embodiments, as FIG. 3A illustrates in the cross-sectional schematic view of a substrate, a PDLC layer 310 may adhere to the upper surface of substrate 300 directly. In other embodiments, as FIG. 3B illustrates, a PDLC layer 1310 may adhere to the lower surface of substrate 300 directly. While FIGS. 3A and 3B illustrate different locations of the PDLC layer 310, it may be noted that each layer may be utilized separately or together (e.g. a PDLC 310 layer above and below substrate 300). Accordingly, a plurality of PDLC layers may be applied to various surfaces of device 100 and or in stack of PDLC layers.

In some embodiments, the PDLC may be incorporated into the display stack. For example, the PDLC layer may be placed within the display stack and may not be adjacent any surface of the window.

Figure 4:
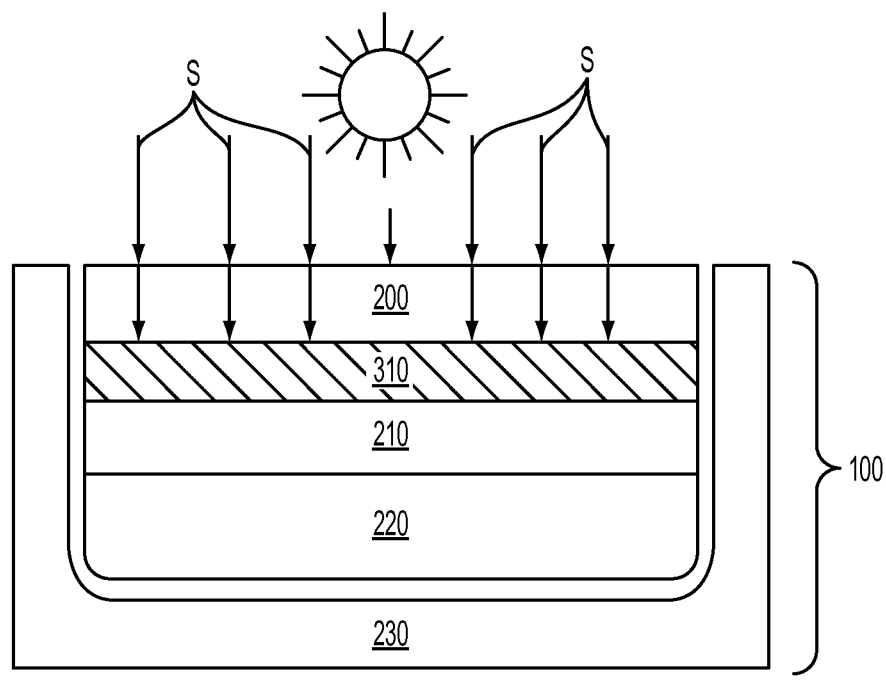
FIG. 4 illustrates a cross-sectional schematic view of the device of FIG. 1, showing solar radiation on various components interrupted by a thermal shielding barrier of the device.

In accordance with various embodiments, FIG. 4 illustrates a device 100 with the PDLC layer 310 positioned below window 200. It may be noted that solar radiation "S" (which may include any electromagnetic radiation in the UV, visible light and inferred spectrums) passes through window 200 but may not pass through the PDLC layer 310 when that layer is opaque. As the light (or a portion of the light) may not pass though the PDLC layer 310 the display stack 210 and the internal electronic hardware 220 may be spared from at least a portion of the harmful effects of solar radiation "S". In various embodiments, the PDLC layer 310 may be located on top of the window 200. In this position PDLC layer 310 may limit a portion of the harmful effects of solar radiation "S" on window 200 and/or the components below window 200.

Figure 5:
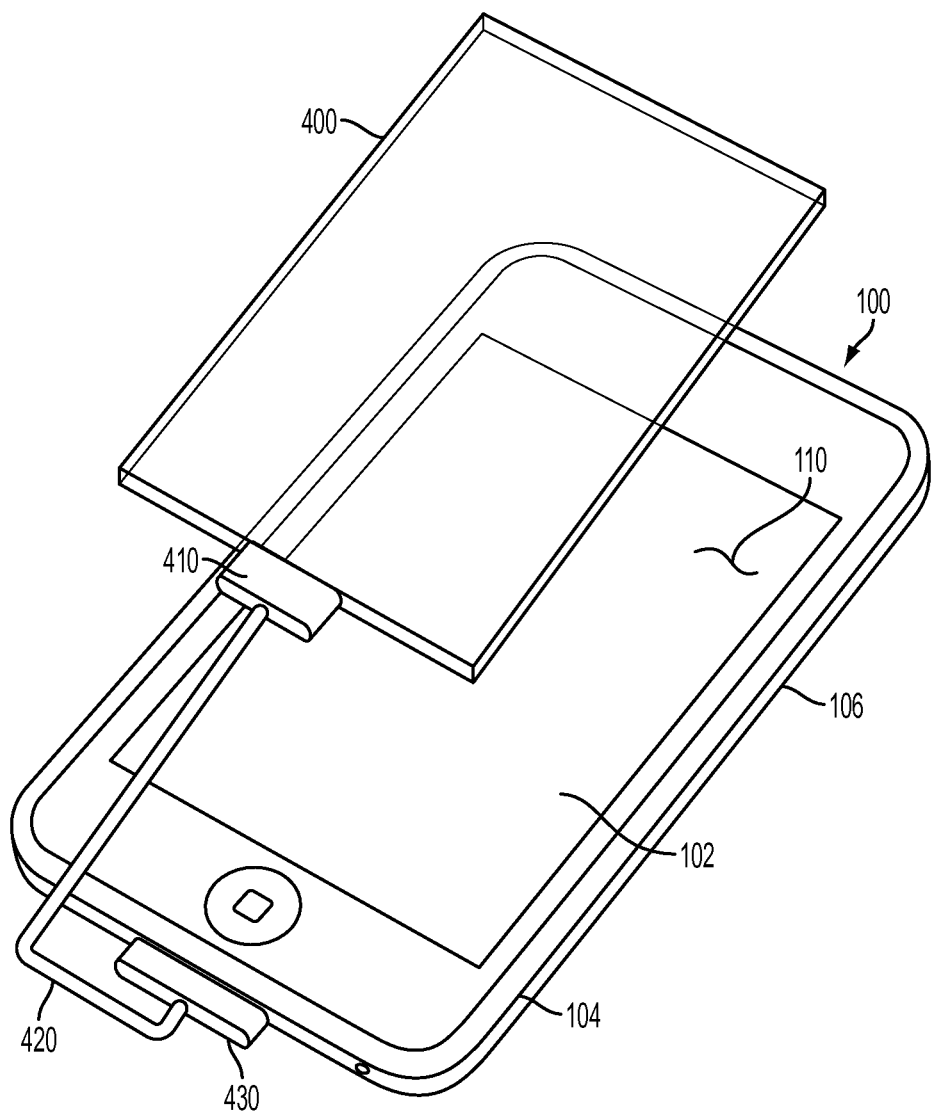
FIG. 5 illustrates a user device utilizing a display and an external thermal shielding barrier accessory.

In accordance with certain embodiments and as illustrated in FIG. 5, the PDLC layer may take the form of an accessory external to the electronic device 100. For example, a device 100 may be in communication with an accessory PDLC layer 400. In various embodiments, accessory PDLC layer 400 may have a connector 410 and a communication line 420. Device 100 may have an external communication port 112 (as illustrated in FIG. 1) connected to a connector 430. Connector 430 may also be in communication with communication line 420. In this configuration, accessory PDLC layer 400 may be removable from device 100. Accessory PDLC layer 400 may also be placed over window 110 to provide solar radiation blocking characteristics. In some embodiments, accessory PDLC layer 400 may be controlled by device 100 directly. In other embodiments, accessory PDLC layer 400 may not be controlled by device 100 but instead directly by a user, either through an external control, an input of the device 100, or an application operating on the device 100. Further, accessory PDLC layer 400 may be controlled by device 100, by a user control on the PDLC layer in combination or separately. Accessory PDLC layer 400 may be incorporated into another device accessory, such as a case, a cover, a screen protector, a docking station or the like. In various embodiments, accessory PDLC layer 400 may be a standalone device with its own controls and power supply. In such and embodiment, PDLC layer 400 may provide functionality for a device 100 but not rely on device 100 for the functionality of PDLC layer 400.

Figure 6:
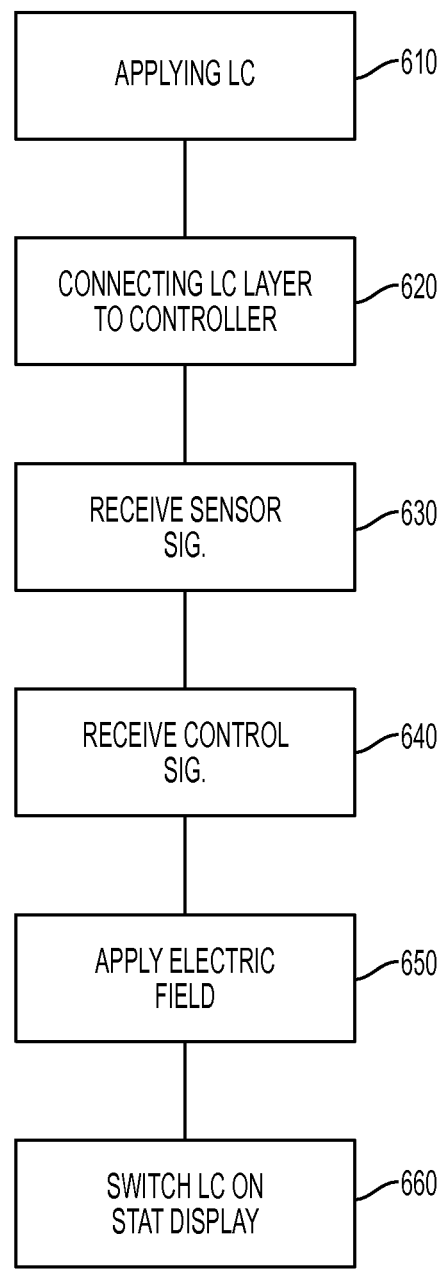
FIG. 6 is a flowchart illustrating a sample method of improving thermal performance in a device using a liquid crystal switching barrier.

FIG. 6 generally shows a method of manufacture and operation for a PDLC layer. In accordance with various embodiments, as illustrated in FIG. 6, the thermal performance of device 100 may be improved by applying a polymer dispersed liquid crystal (PDLC) layer to a device screen as in operation 610. Operation 610 may be performed in a variety of manners. In one embodiment, the PDLC layer may be applied internally to device 100 such as below and adjacent to the device window. In one embodiment, the PDLC layer may be applied externally. In one embodiment the PDLC layer may be applied as an accessory device. In one embodiment, the PDLC layer may be applied as a top layer. For example, a device cover window may be located between PDLC layer and at least a portion of the internal hardware. Alternatively or additionally, the PDLC layer may be applied internally within the device. For example the PDLC layer may be located between the cover window and at least a portion of the internal hardware. In one embodiment, the PDLC may be applied to a plurality of exterior surfaces of the device. Coating a plurality of surfaces with the PDLC layer may allow solar radiation to be blocked at the enclosure, in addition to at the display screen. Additionally, each of these embodiments may be performed individually or in combination with one another The PDLC layer may also be connected to a controller within the device hardware, firmware or software (e.g. device hardware 220 of FIGS. 2 and 4) of device 100 as in operation 620. In accordance with various embodiments, the PDLC layer may also be placed in communication with a controller within the hardware (e.g. hardware device 220 of FIGS. 2 and 4) of device 100. The device hardware may drive a voltage across the PDLC layer. The device hardware controller may trigger another component to drive a voltage across or to the PDLC layer, such as a component that is a part of an accessory PDLC layer (one example of which is shown in and discussed with respect to FIG. 5).

Generally, the first two operations may be performed by a manufacturer of a device or may be performed by a user employing an add-on accessory, such as the one depicted in FIG. 5. It should be appreciated that operations 630-660 are part of a method of operation, and may stand alone from operations 610 and 620. That is, operations 630-660 generally describe one sample operation of an embodiment in a non-limiting fashion, and may be performed by an embodiment without reference to or requiring that same embodiment to perform the foregoing operations.

Turning to operations 630-660, in operation 630 the device hardware (or firmware, or software) may receive an input from one or more sensors. That is, the device hardware may receive a first sensor signal or other input indicating that a temperature threshold has been crossed or a user signal indicating a user selection. The device hardware may receive a signal from at least one of a temperature sensor, an exterior interface, or a programmable memory (and/or any other input device discussed herein or otherwise developed). With respect to FIG. 6, it should be understood that the term "hardware" encompasses software and firmware as well.

In response, in operation 640 the device hardware may generate a switching or control signal to the PDLC layer (or a controller thereof) in response to receiving the signal from the at least one of the temperature sensor, an exterior interface, or a programmable memory. Alternately, operation 640 may be omitted and the device hardware may directly generate and apply an electric field or signal to the PDLC in accordance with operation 650.

In response to the first signal, an electric field may be applied to the PDLC layer in operation 650. For example, the electric field may be applied in response to the first input. The electric field may be generated by a variety of sources. In one embodiment, the device may provide the field. For example, another layer in the device or another component on the device may induce an electric field on the PDLC layer. In one embodiment, the PDLC layer may produces the electric field across itself. For example, the PDLC layer may have its own voltage supply configured to place a voltage across the PDLC layer.

Next, in operation 660, in response to the application of the electric field across the PDLC, the liquid crystal state may be switched and the optical axis of the PDLC may be re-oriented. Application of the electric field may change the state of the PDLC layer to one of a transparent state, an opaque state, or a translucent state including any gradient between transparent and opaque states.

In accordance with various embodiments, the transition from a first state to a second state, second state to a third state, or from a first state to a third state may be controlled by manipulating the electric field. For example, the opacity/darkness of the PDLC layer may increase as voltage increases (or, in some embodiments, increase as voltage decreases). Thus, some embodiments may employ a PDLC layer that has a tri-state configuration, or that may vary opacity smoothly or among a number of levels. For example, if a PDLC layer has a maximum operating voltage of 12 volts, zero volts applied to the PDLC may result in a fully transparent layer while 12 volts equates to a fully opaque layer.

It should be appreciated that some embodiments may employ a PDLC layer or film that is not fully opaque, even when a voltage or maximum voltage is applied. For example, in one embodiment the PDLC, hen operating in a fully radiation-blocking mode, may appear as a "haze" on or over the display instead of fully opaque. Such an embodiment may block roughly 5-15% of light from passing through the display. This may permit the use to still view the display and anything displayed thereon while reducing or slowing heating of the interior of the electronic device.

Additionally, the visual effect and speed of the transition of the PDLC layer may be controlled. For example, the transition may be from substantially transparent directly to substantially opaque. The transition may be from substantially transparent directly to translucent. Alternatively, the transition may not be direct. For example, the transition may be from substantially transparent to varying degrees of translucence until the transition reaches a substantially opaque stage. The transition may also vary in speed. For example, the transition from substantially transparent to substantially opaque may be substantially instantaneous. Alternatively, the transition from substantially transparent to substantially opaque may be gradual. In one embodiment, the transition may coincide with the increase in temperature. For example, after a certain threshold (as one example, 35 degrees Celsius) each increase of a unit of temperature may coincide with an increase in voltage applied across the PDLC layer. As such, the PDLC layer may offer both varying degrees of protection (e.g. protection may increase as the device gets hotter and the PDLC layer more opaque or translucent) and also a visual indicator that the device is overheating.

In addition to, or as an alternative to, the foregoing, the transitions between states may be controlled by a variety of inputs. For example, user input may control the transition between states. User input could include a command input through a touch screen, a timer, or other programmable capabilities that a user could control directly. User input could also include physical switches like an exterior button/switch on the electronic device, an exterior button/switch on an accessory that the PDLC may be a part of (e.g. a phone cover incorporating the PDLC layer), or any similar physical feature that a device user could interact with. Additionally or alternatively, automatic controls may also drive the PDLC layer. For example, the electronic device could include an interior temperature sensor, and exterior temperature sensor, light sensor, a program that actives the PDLC layer in response to non-use of the device, or similar programs, feedback features and/or a combination of programs, feedback features, and user inputs. Likewise, a system or device timer may be used to switch the PDLC layer between states without user intervention. It should also be appreciated that thresholds and the like may be defined to switch the PDLC layer from an opaque or blocking state to a transparent or permissive state in addition to the reverse. If internal temperature drops below a certain point, for example, the PDLC layer may be changed from an opaque state to a transparent state. This may be implemented by generating a second signal from internal hardware (or firmware or software) to the PDLC or a PDLC controller once an internal temperature drops below a threshold. As an alternative, the voltage applied to the PDLC may be stopped once the threshold is passed.

Energizing the PDLC layer generally consumes power, which may give off heat as a byproduct. By creating the electric field and placing the PDLC layer in a translucent or opaque state, less solar radiation is able to add to the heat generation of the device. Less heat added by solar radiation reduces or eliminates the device's potential to overheat. While it may be counterintuitive to add heat through power consumption to cool the device, the benefits of having the switchable solar radiation blocking effects of the PDLC layer may overcome the heat added in the energizing of the layer. Stated another way, the amount of solar radiation received for any given device area may be much higher than heat generated by activating the PDLC.

In accordance with various embodiments, an electronic device with a PDLC layer may spread or vent heat to the surface of the device in order to prevent or reduce a chance of the device overheating. That is, the PDLC layer may act as a thermal path or spreader to direct heat away from the layer, window, cover, display or the like and to another portion of the device. The PDLC may be configured to provide this functionality in a variety of ways. For example, certain portions of the PDLC may be darker or blacker than others, thereby absorbing more heat. Likewise, thermally conductive paths may be defined within the PDLC layer to transfer heat to various portions of the device and away from thermally sensitive areas or regions.

In various embodiments, a PDLC layer on an electronic device may provide the ability to limit solar loading and enable the use of a smaller device surface area. For example, temperature of an electronic device subject to solar loading may also be lowered by increasing the surface area of the device or increased by lowering the surface area of the device. Increased surface area may result in increased convection and radiation. Thus, by utilizing a PDLC layer on a portable electronic device, it may be possible to maintain a lower temperature in a smaller electronic device form factor.

Figure 7A:
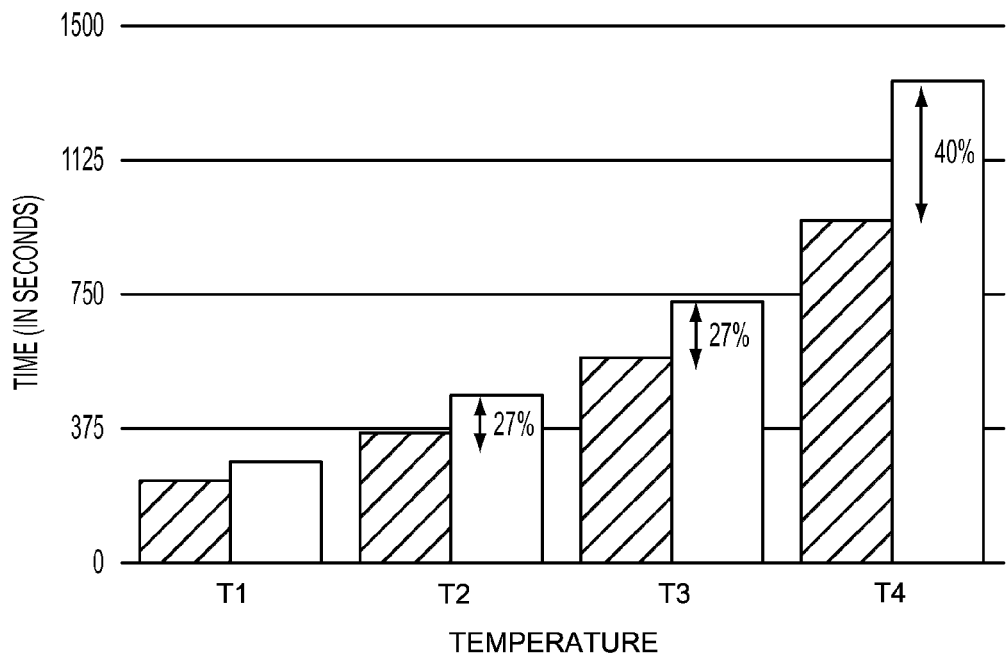
FIG. 7A shows sample data graphed as time vs. temperature.

In one example, the use of the PDLC layer on an electronic device may delay the time taken by the device to reach various temperatures. Referring to the chart in FIG. 7A, which shows sample data graphed as time vs. temperature, it may be seen that an electronic device with an associated PDLC layer (as represented by the shaded bars of the chart) takes more time to reach various temperatures, during operation and when under a thermal load, when compared to an electronic device lacking any PDLC layer (as represented by the un-shaded bars). For example, a device with a PDLC layer may take about 40% longer to for its internal temperature to reach a certain high temperature, represented by the rightmost bars of FIG. 7A, than it takes a similar device lacking the PDLC layer.

Figure 7B:
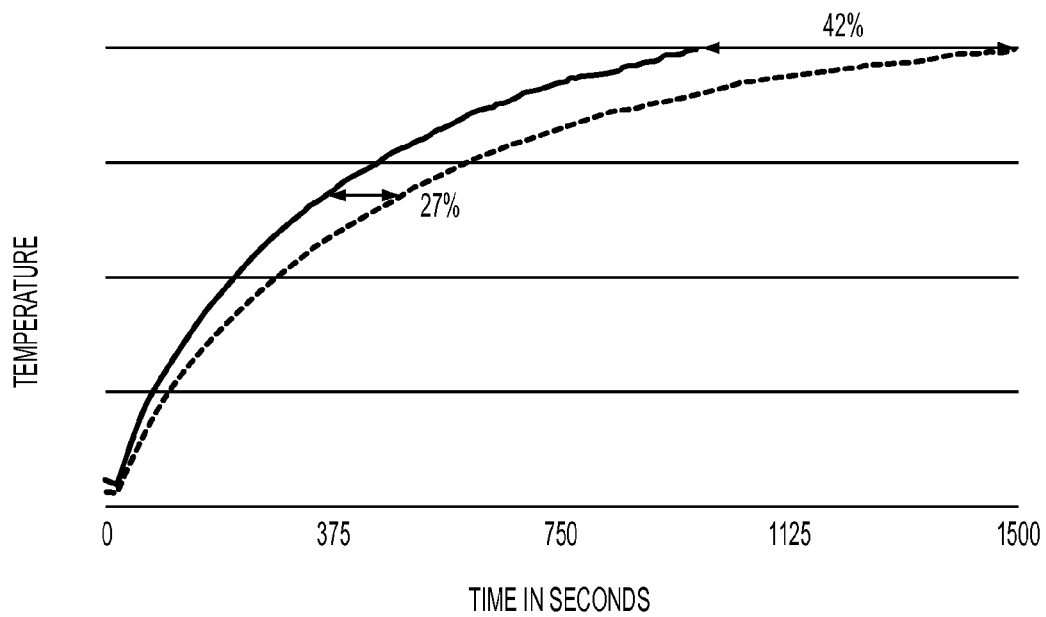
FIG. 7B shows sample data related to the time it takes to reach an internal shutdown temperature.

Referring to FIG. 7B, certain sample data may show that the use of a PDLC layer in an electronic device extends the time it takes to reach an internal shutdown temperature. As can be understood from FIG. 7B, utilization of the PDLC layer flattens the temperature versus time curve. As such, depending on what temperature is set as a thermal shutdown temperature, thermal shutdown may be avoided completely. Some embodiments may extend the usage time of an electronic device having a PDLC layer by 20-30%.

Although the foregoing discussion has presented specific embodiments, the foregoing merely illustrates the principles of the embodiments. Persons skilled in the art will recognize that changes may be made in form and detail without departing from the spirit and scope of the disclosure as various modifications and alterations to the described embodiments will be apparent to those skilled in the art, in view of the teachings herein. For example, the processing steps may be performed in another order, or in different combinations. It will thus be appreciated that those having skill in the art will be able to devise numerous systems, arrangements and methods which, although not explicitly shown or described herein, embody the principles of the disclosure and are thus within the spirit and scope of the present examples. From the above description and drawings, it will be understood by those of ordinary skill in the art that the particular embodiments shown and described are for purposes of illustration only, and references to details of particular embodiments are not intended to limit the scope of the present examples, as defined by the appended claims.

We claim:

1. A device comprising:
a cover window protecting an internal hardware element;
a display stack underlying the cover window;
a polymer dispersed liquid crystal (PDLC) layer positioned adjacent to the cover window, the PDLC layer is in communication with the internal hardware; and
a temperature sensor in communication with the internal hardware element; wherein
the PDLC layer is operable in a first state and a second state;
the internal hardware element switches liquid crystal of the PDLC between the first state and the second state in response to a signal from the temperature sensor; and
the internal hardware element provides at least one of a switching signal or power supply for applying an electric field to the PDLC layer.

2. The device of claim 1, wherein:
the PDLC layer includes a liquid crystal array that is aligned in the first state in response to an electric field being applied; and
the liquid crystal array is not aligned in the second state in response to the electric field not being applied.

3. The device of claim 1, wherein:
the PDLC layer includes a liquid crystal array that is not aligned in the first state in response to an electric field being applied; and
the liquid crystal array is aligned in the second state in response to the electric field not being applied.

4. The device of claim 1 further comprising: an exterior interface in communication with the internal hardware element, wherein the internal hardware element switches the liquid crystal between the first state and the second state in response to a signal from the exterior interface.

5. The device of claim 1 further comprising a timer provided by a programmable memory in communication with the internal hardware, wherein the internal hardware switches the liquid crystal between the first state and the second state in response to a signal from timer provided by the programmable memory.

6. The device of claim 1, wherein the PDLC layer is positioned internally to the device and is located between the cover window and at least a portion of the internal hardware.

7. The device of claim 1, wherein the PDLC layer is integrated into the display stack.

8. The device of claim 7, wherein the PDLC layer is externally connected to the device through an external communication port.

9. The device of claim 1, wherein the PDLC layer covers more than one surface of the exterior of the device.

10. A method of improving thermal performance of an electronic device comprising:

receiving a first signal generated by a component internal to the electronic device and external to a display;

changing a voltage supplied to a thermal shielding layer in response to the receiving the first input, the voltage changing from a first level to a second level; and through changing the voltage to the second level, darkening the thermal shielding layer; wherein the first signal is generated in response to an internal temperature of the electronic device.

11. The method of claim 10, further comprising the operation of changing the voltage from the second level to the first level when an internal temperature of the electronic device drops below a threshold.

12. The method of claim 11, wherein the second level is a positive voltage and the first level is zero.

13. The method of claim 10, wherein changing the voltage to the second level renders the thermal shielding layer opaque.

14. The method of claim 10, wherein: the operation of changing the voltage from the first level to the second level comprises: changing the voltage level from the first level to at least one intermediate level; and changing the voltage from the at least one intermediate level to the second level; wherein the thermal shielding layer is darker when the voltage is at the intermediate level than when the voltage is at the first level; and the thermal shielding layer is darker when the voltage is at the second level than when the voltage is at the intermediate level.

15. The method of claim 14, wherein the thermal shielding layer is translucent when the voltage is at the second level; and the second level corresponds to a maximum voltage.

16. The method of claim 10 wherein the thermal shielding layer is a polymer dispersed liquid crystal layer.

17. A liquid crystal switching barrier accessory comprising:

a polymer dispersed liquid crystal (PDLC) layer operable in a first state and a second state, wherein the PDLC layer is movable and configured to be placed adjacent to an exterior cover window of a display of an electronic device;

a hardware component configured to switch the crystals in the PDLC layer from a first state to a second state; and an input, configured to connect to the electronic device and receive at least one of a switching signal or power supply.

\* \* \* \* \*